J. REECE.
STOP MOTION.
APPLICATION FILED SEPT. 5, 1916.
1,220,785.
Patented Mar. 27, 1917.
2 SHEETS—SHEET 1.
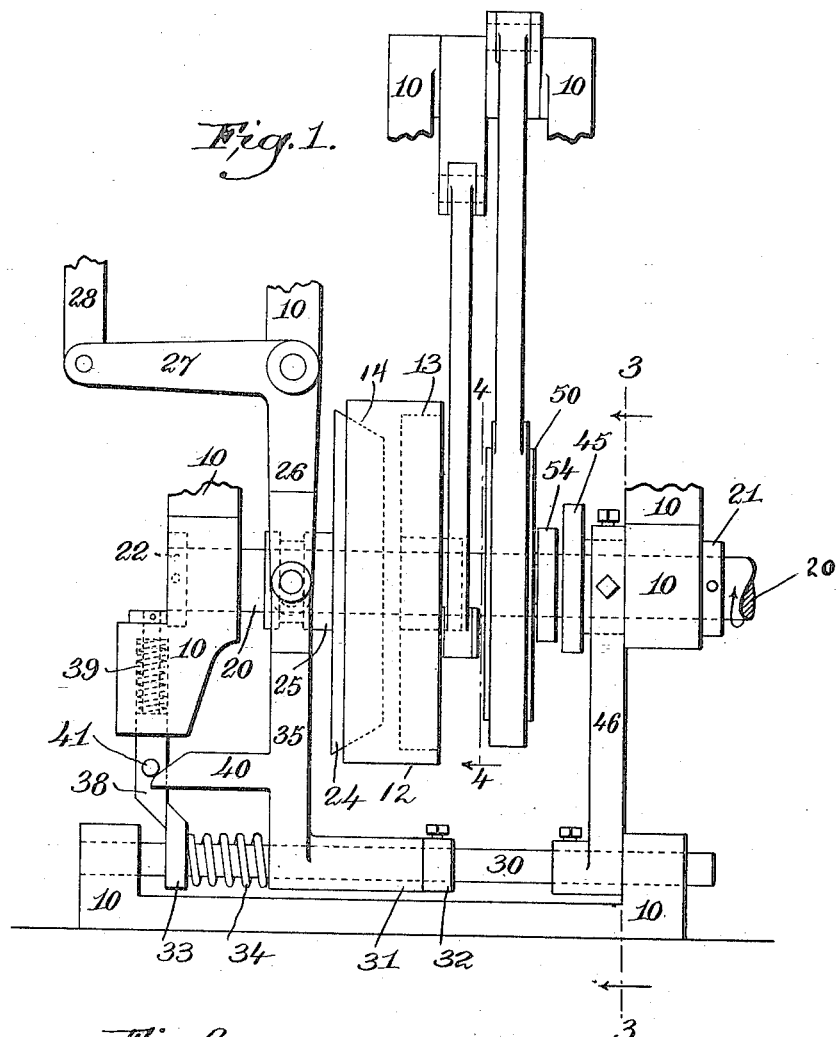
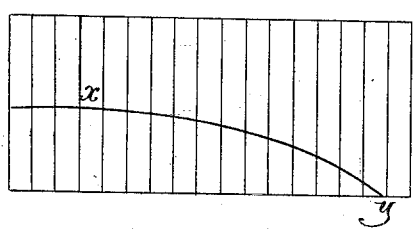

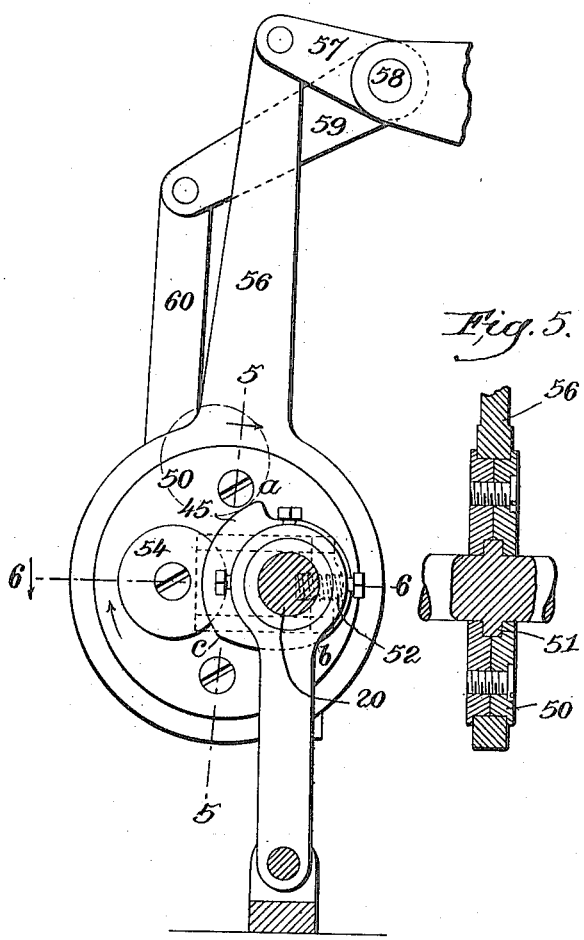
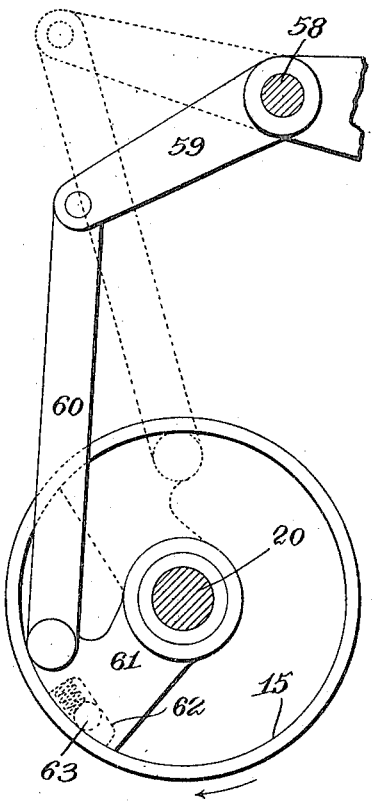
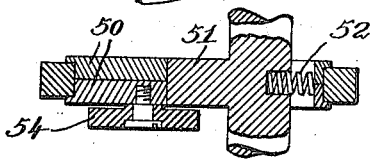

UNITED STATES PATENT OFFICE.

JOHN REECE, OF MANCHESTER, MASSACHUSETTS.

STOP-MOTION.

1,220,785.     Specification of Letters Patent.     Patented Mar. 27, 1917.

Application filed September 5, 1916. Serial No. 118,485.

*To all whom it may concern:*

Be it known that I, JOHN REECE, a citizen of the United States, residing at Manchester, in the county of Essex and State of Massachusetts, have invented certain new and useful Improvements in Stop-Motions, of which the following is a specification, reference being had therein to the accompanying drawings.

This invention relates to stop motions, such for example as are adapted to be employed in connection with high speed power driven machines of various kinds.

The main object is to afford an efficient and smooth working stop motion adapted to promptly bring to a stop the shaft in question without substantial or objectional shock and in a substantially definite final shaft position.

Another object is to provide a stop motion wherein no reliance is placed upon mere friction as a retarding means, but in which the driven or rotated parts are slowed down by a mechanical restraining operation which takes place in a definite manner so as to progressively remove the destructive power or energy; this action preferably continuing until the energy and motion are reduced to zero, giving stoppage in the required final angular position.

A further object is to accomplish the desired results by a species of reaction between the constantly rotating power parts and the driven or rotated parts during the period of slowing down while stopping.

Other and more detailed objects will be elucidated in the hereinafter following description or will be apparent to those skilled in the art.

To the accomplishment of the above referred to objects the present invention consists in the novel stop motion, combinations, mechanisms, arrangements, devices and details herein illustrated, described, referred to or claimed.

The accompanying drawings illustrate one form in which the principles of the present invention may be embodied. Figure 1 is a front elevation of a stop motion embodying the present invention, the parts being shown in their normal running condition.

Fig. 2 is a speed diagram showing one manner in which the speed of the driven parts may be reduced up to the point of stoppage.

Fig. 3 is a right elevation partly in section, on the plane 3—3 of Fig. 1.

Fig. 4 is a right elevation partly in section, on the plane 4—4 of Fig. 1.

Fig. 5 is a section on the plane 5—5 of Fig. 3.

Fig. 6 is a section on the plane 6—6 of Fig. 3.

In addition to the various fixed frame parts or brackets 10, the illustrated mechanism comprises what may be termed constantly rotating power parts which continue to rotate when the machine itself is brought to a stop; driven parts adapted to be rotated by the power parts during the normal running of the machine and to be disengaged therefrom when the machine is stopped; and the mechanism or stop motion by which the driven parts are brought to rest promptly, without substantial shock, and in a definite final position.

Generally speaking the stop motion parts comprise what may be termed a crank device associated with the driven parts, and what may be termed a grip device associated with one of the constantly rotating power parts, together with connections between the grip device and crank device whereby the reaction previously referred to is brought about and the driven parts are caused to be slowed down by mechanical restraint.

By the term crank device I intend to include anything in the nature of a revolving crank or arm turning with the rotating driven parts, such for example as the ordinary eccentric, upon which pressure or restraint may be imposed when the parts are turning under momentum so as to bring about a slowing down and preferably an actual stoppage. By a grip device I have reference to any sort of device which normally is ineffective but which, like a tooth or pawl or wedge, may at the proper time be caused to grip or engage with a rotating power part so that the latter may have some control or restraint over the grip device. Thus, a device known as a silent pawl, comprising a sphere which becomes wedged to effect a gripping, may be the grip device.

The principle of the present mechanism may in one aspect be said to consist in the control or reaction afforded by the grip device over the crank device; the grip device coming into play at the proper time to rotate or move circularly with one of the rotating power parts for a fraction of a rotation until reaching its dead center position, during which motion the connecting parts extending from the grip device to the crank device cause a progressively increasing restraint on the latter, terminating with a cessation of motion in the crank when the grip device has reached its dead center position, so that in a gradual and shockless manner the driven parts are compelled to slow down and come to rest without the interposition of frictional retarding means.

The action may be diagrammatically represented as in Fig. 2 in which the ordinates represent speed of the driven parts, while the horizontal distances represent lapse of time or rotation of the constantly rotating power parts. The diagram indicates that up to the point $x$ the speed of the driven parts is uniform, but that after the point $x$ the speed is caused to gradually decrease until at the point $y$ the speed is zero, the parts having thus been brought to rest with practically no shock. The entire distance from $x$ to $y$ may correspond with a fraction of a rotation of the power part, for example, 130°, the horizontal space between each two vertical lines representing 10°.

In the illustrated mechanism the constantly rotating power parts include a pulley 12 which may be supposed to be engaged by a power belt. This pulley at its interior is provided with a transverse web near its center leaving annular recesses at both the right-hand and left-hand sides of the pulley. The recess within the left side of the pulley is in the form of a cone 14 adapted to form one part of a cone clutch. At the other side the pulley is formed with a simple rim the interior surface 15 of which forms a clutch or gripping surface for purposes to be explained.

The described parts 12, 14, 15, constitute the entire power parts of the present embodiment although a suitable hub for the pulley 12 will of course be understood. This hub loosely surrounds the driven shaft 20 so that the power parts and driven parts are concentrically arranged. Suitable collars on the driven shaft will be understood in order to maintain the pulley in its proper longitudinal position.

The driven shaft has its bearings in fixed frame parts 10, 10 near its two ends, and collars 21 and 22 are provided to retain the shaft against axial displacement.

Having thus referred to the power parts and the driven shaft, I will describe the connections by which the shaft is normally driven at its full speed during the stitching or other operation of the machine.

For this purpose a cone clutch is employed of which the cone shaped interior 14 of the pulley is one member and a complementary cone 24 is the other member. The cone 24 is formed with a grooved hub 25 which is splined so as to rotate with the shaft 20 but to permit longitudinal sliding for the purpose of engaging and disengaging the clutch.

The peripheral groove of the hub 25 is engaged by a pair of opposite studs carried on a yoke arm 26 which arm is a portion of a bell crank lever centrally fulcrumed to a frame part and having a second arm 27 from which is shown extending a link 28. Pushing or pulling on the link 28 effects the opening or closing of the clutch 14, 24; and the link 28 may be assumed to extend to a suitable operating lever.

As will appear, the present stop mechanism is preferably such that when the operating link 28 is thrown to disengage the cone clutch the stop mechanism is automatically applied; that is to say, the swinging of the bell crank lever 26, 27 effects both the disengagement of the power and the application of the stop motion.

The stop mechanism parts, which are mainly contained within and to the right of the pulley 12, are arranged to be set in action by the shifting of a control slide or bar or member 30 which will be first described. The bar 30 is seen to be fitted in fixed frame part 10, with bearings to permit its horizontal sliding. Loose on the bar 30 and arranged to slide lengthwise of it is a sleeve 31 which normally abuts against a collar 32 fast on the bar 30. A second collar 33 fast on the control bar 30 is separated from the sleeve 31 by a spring 34 which is under compression and tends to move the control bar to the left unless otherwise prevented. In the position shown, the bar is prevented from moving to the left by its collar 32 abutting against the sleeve 31, and also by its collar 33 abutting against a part which will be described.

The purpose of this structure is to prevent the leftward shifting of the control bar until the proper instant of time, and to then insure its sudden shift to the left. The action is effected through the sleeve 31 which will be seen to have an upward extension 35 yoked at its top end to engage the same studs which are engaged by the yoke arm 26.

By this arrangement, when the operating link 28 is lifted and the bell crank 27, 26 shifted, the arm 35 and sleeve 31 are thrown to the left. At first this merely compresses the spring 34. The control bar is prevented from moving to the left by a latch 38 standing in the path of the collar 33. The engaging parts 33 and 38 have inclined cam faces to permit their subsequent unlatching when the parts are to be restored to original position.

The latch 38 normally stands in the illustrated position obstructing the leftward movement of the control bar, and a spring 39 tends to hold the latch there. In order to lift the latch and release the control bar, the arm 35 is provided with a leftward cam extension 40 engaging beneath a stud 41 provided on the latch 38.

By this arrangement, as the sleeve 31 is moved to the left, the cam 40 gradually lifts the latch 38 while the spring 34 is being compressed. At the end of this movement the latch releases the collar 33 and the control bar 30, unless otherwise prevented, jumps quickly to its left-hand position. This movement of the bar, however, is further prevented by a device to be described, unless or until the driven shaft is at a certain point of its rotation.

As thus far described the lifting of the operating link 28 disengages the cone clutch and causes the control bar 30 to press toward the left, and now will be described how the control bar controls the action of the stopping mechanism.

A non-rotatable control cam 45 at the top of the arm or extension 46 of the bar 30 loosely surrounds the driven shaft 20 and is adapted to be moved axially along the shaft by the movement of the bar 30. In the position in which the parts are shown this axial movement cannot take place, since the cam 45 overlaps a roller 54 later to be described. When the roller has moved to such a position as to permit the cam to shift to the left with the bar, the stop mechanism is brought into play.

What I have termed a crank device on the driven shaft is shown in the form of an eccentric 50 which rotates with the shaft 20. This eccentric is made in halves bolted together face to face to facilitate assemblage. The eccentric or crank device is not integral with the shaft 20 but is adapted to be shifted transversely to the axis in order to change the throw of the eccentric, and for this purpose a rectangular aperture is formed in the eccentric engaging a square extension or arm 51 integral with the shaft. A spring 52 is arranged to hold the eccentric in the position shown in which its throw or eccentricity is minimum, and the square extension comes up against the end of the recess in the eccentric forming a stop, as seen in Fig. 3.

During the normal running of the machine the eccentric possesses its minimum throw, as shown, and in this condition it is ineffective for stop motion purposes. When the stop motion is brought into play the eccentric's throw is increased to its maximum for a portion of a rotation by means of a cam roller 54 mounted on the face of the eccentric. This is the roller previously referred to, which, in the illustrated position of the parts, restrains the cam 45 from moving into its operative position.

The cam 45 is shown as cut away from $a$ to $b$, and when the roller 54 passes around beyond the point $a$ the cam together with the bar 30 is permitted to jump to the left and assume operative position. The cam is concentric from $a$ to $b$. From $b$ to $c$ the cam is eccentric and serves to force the roller 54 outward. This bodily slides the eccentric on the extension 51 against the resistance of spring 52. The eccentric has its maximum throw when the roller has reached the cam point $c$. From $c$ to $a$ the cam is concentric, and as the roller passes along this portion of it the eccentric 50 operates with maximum throw. It is during this portion of the action that the stopping occurs.

The eccentric 50 is surrounded by the usual eccentric strap and rod 56, the rod extending upwardly and being pivoted to a short rock arm 57 on a fulcrum shaft 58 and connected to a second and longer rock arm 59 from which extends a connecting rod 60.

These connections 56—60 constitute the connections between the crank device or eccentric 50 and a grip device or swinging pawl 61 associated with one of the constantly rotating power parts, namely, the rim 15 of the power pulley 12. The grip device 61 has its hub loosely surrounding the driven shaft 20, and normally the grip device oscillates up and down for a slight inoperative extent. This oscillation is caused by the play of the eccentric 50 and the connections 56—60.

It will be understood that the coöperation between the grip device 61 and the power part or rim 15 is that the former at a certain point of time on the stopping action is caused to move uniformly with the latter. Within the device 61 is a tapered recess 62 containing a spring-pressed sphere 63. This device constitutes what is known as a silent pawl. The rim 15 is rotating uniformly clockwise in Fig. 4. It is clear that the grip device 61 may not rotate in the same direction at any faster speed, since the sphere 63 would immediately wedge against the rim 15.

During the normal running of the machine the oscillation of the grip device 61 is slight in extent and slow in speed, since the eccentric 50 is at its minimum throw. During the stopping, however, the eccentric changes to its maximum throw, as described, and tends to advance the grip device 61 to a greater extent and speed. In fact the parts are so designed that the grip device tends to rise from its full line position of Fig. 4 to its dotted line position at a speed greater than the uniform rotation of the rim 15.

This high speed being rendered impossible by the grip device, it follows that the grip device and the rim will rise uniformly to the dotted line position which, being the dead center, terminates the movement of the grip device, the constantly rotating rim continuing its movement idly.

This restraining of the grip device by the power rotated rim effects a reaction upon the eccentric through the links and arms 56—60. Since the eccentric is tending to advance the grip device at an increasing speed which is rendered impossible by the engagement of 61 and 15, it follows that the eccentric is held back. This restraining action opposes the momentum which is left in the driven parts and the momentum and energy are thus progressively eliminated. It may be said that the energy is thrown back through the grip device into the constantly rotating power parts. The forced slowing action of the eccentric, and therefore of the driven shaft which turns with it, is terminated in an easy manner at that stage of rotation in which the grip device has reached its dead center position shown in dotted lines in Fig. 4. At this time the cam roller 54 has reached the dotted line position of Fig. 3. The roller and the eccentric have not yet reached the highest point of their movement. Further rotation or elevation is positively prevented because the grip device being at its dead center has straightened out into alinement with the link 60 so that the rock arms 59, 57, and therefore the eccentric strap 56, are incapable of elevating farther.

While the above description has taken in the operation, the following brief restatement of the operation may be made. The machine is supposed to be running normally with the parts in the position shown. The bar 30 and the cam 45 are locked to the right and the cone clutch is engaged. When the operating link 28 is pulled up, at any suitable time, for example at will, this unclutches the cone clutch and moves the sleeve 31 to the left. This compresses the spring 34 and lifts the latch 38. When the latch is completely lifted, the bar 30 is ready to jump to the left, which it will do immediately or as soon as the cam roller 54 is in suitable relation to the cam 45. The cam having shifted into the plane of the roller, the two may coöperate, and the roller during the final rotation is thrown outwardly by the cam, as previously described, so as to shift the eccentric 50 from its minimum to its maximum throw. As the cam roller rises, while it rolls around the cam from $c$ toward $a$, it tends to lift the eccentric strap and rod 56, the arms 57 and 59 and the link 60 with an excessive speed owing to the increased throw. This excessive speed, however, is prohibited by the binding of the grip device 61 against the rotating rim 15. It follows that the members 56—60 are restrained from rising as impelled by the momentum of the driven parts. In consequence the eccentric is restrained from rotation and this gradually increasing restraint is imposed on the driven shaft 20. At its maximum the throw of the eccentric is greater than the length of the crank 5 so as to prevent its passing around its highest point or dead center, and indeed the eccentric is compelled to positively stop when the roller 54 has reached the dotted line position of Fig. 3.

It will thus be seen that a definite final shaft position is always secured, namely, that position indicated in Fig. 3 by the dotted line position of the roller 54. The stoppage is shockless, since the restraining of rotation has been progressive as indicated in Fig. 2, the speed being gradually brought down to zero thus dispensing with the need of any impact or supplementary stop.

It will thus be seen that a stop motion has been described operating according to the principles and attaining the objects and advantages of the present improvement. Since many matters of combination, arrangement, design and detail may be variously altered or modified without departing from the underlying principles, no limitation to such features is intended except in so far as set forth in the appended claims.

What is claimed is:

1. A stop motion comprising in combination with the constantly rotating power parts, and the rotary driven parts to be stopped, reciprocating means adapted to be put into effect when the driven parts are rotating under momentum whereby a power part is caused to exert restraint against the rotation of the driven parts.

2. A stop motion comprising in combination with the constantly rotating power parts, and the rotary driven parts to be stopped, reciprocating means adapted to be put into effect when the driven parts are rotating under momentum whereby a power part is caused to exert restraint against the rotation of the driven parts to hold back the rotation thereof with a progressively decreasing speed giving a definite final stopped position.

3. A stop motion comprising in combination with the constantly rotating power parts, and the rotary driven parts to be stopped, a reciprocating link and lever system between a power part and a driven part, and means for putting said system into effect during a portion of a rotation for causing the power part to produce a restraint upon and stoppage of the driven part in a definite position.

4. A stop motion comprising in combination with the constantly rotating power parts, and the rotary driven parts to be stopped, a reciprocating link and lever system between a power part and a driven part, and means for putting said system into effect during a portion of a rotation for causing the power part to produce a restraint upon and stoppage of the driven part in a definite position, said link and lever system adapted to attain a dead center condition to preclude rotation beyond the desired position.

5. A stop motion comprising in combination with the constantly rotating power parts, and the rotary driven parts to be stopped, a crank device rotating with the driven parts and through which restraint may be imposed for the stoppage thereof, and connections adapted to be rendered operative for the purposes of stopping, whereby a power part temporarily operates to restrain the driven part speed progressively to the point of stoppage.

6. A stop motion comprising in combination with the constantly rotating power parts, and the rotary driven parts to be stopped, a crank device rotating with the driven parts and through which restraint may be imposed for the stoppage thereof, and reciprocating or link and lever connections adapted to be rendered operative for the purposes of stopping, whereby a power part temporarily operates to restrain the driven part speed progressively to the point of stoppage.

7. A stop motion comprising in combination with the constantly rotating power parts, and the rotary driven parts to be stopped, a grip device normally inoperative but adapted to be operatively engaged with a power part during a portion of a rotation during stoppage, and connections from said grip device for progressively restraining the driven parts.

8. A stop motion comprising in combination with the constantly rotating power parts, and the rotary driven parts to be stopped, a grip device normally inoperative but adapted to be operatively engaged with a power part during a portion of a rotation during stoppage, and reciprocating link and lever connections from said grip device for progressively restraining and definitely stopping the driven parts.

9. In combination, constantly rotating power parts, driven parts adapted to be rotated by and disengaged from said power parts, said driven parts including a crank device, and means for stopping the driven parts including a grip device adapted to engage a rotating power part for a portion of a rotation, and connections between said grip device and said crank device whereby the driven parts are slowed during the part rotation of said grip device.

10. A stop motion comprising in combination with the constantly rotating power parts and the rotary driven parts to be stopped, a reciprocating grip device having connections with a driven part, whereby the latter normally reciprocates the former at non-uniform speed, and said grip device so arranged with relation to the constantly rotating power parts that the latter during stoppage causes the grip device to move at a uniform speed, whereby the driven parts are constrained to slow down and stop.

In testimony whereof, I have affixed my signature.

JOHN REECE.

Copies of this patent may be obtained for five cents each, by addressing the "Commissioner of Patents, Washington, D. C."